United States Patent [19]
Witt

[11] Patent Number: 4,466,512
[45] Date of Patent: Aug. 21, 1984

[54] LOADING APPARATUS FOR DIFFERENTIAL BAND BRAKE

[75] Inventor: William F. Witt, Oakland, Calif.

[73] Assignee: Ampex Corporation, Redwood City, Calif.

[21] Appl. No.: 364,826

[22] Filed: Apr. 2, 1982

[51] Int. Cl.³ ............................................ B60T 13/04
[52] U.S. Cl. .................................. 188/171; 188/77 R
[58] Field of Search ...................... 188/77 R, 166, 171

[56] References Cited
U.S. PATENT DOCUMENTS
2,823,325 2/1958 Stephan ........................ 188/171 X
3,651,899 3/1972 Yoshii .

Primary Examiner—Duane A. Reger
Attorney, Agent, or Firm—Charles M. Carman, Jr.; Joel D. Talcott

[57] ABSTRACT

A differential band brake is independently spring loaded at each end so that changes in the differential braking force ratio can be conveniently effected by changing to springs of different strength such as are readily available on the commercial market, rather than by changing the parameters of other portions of the apparatus of types not so readily available.

4 Claims, 3 Drawing Figures

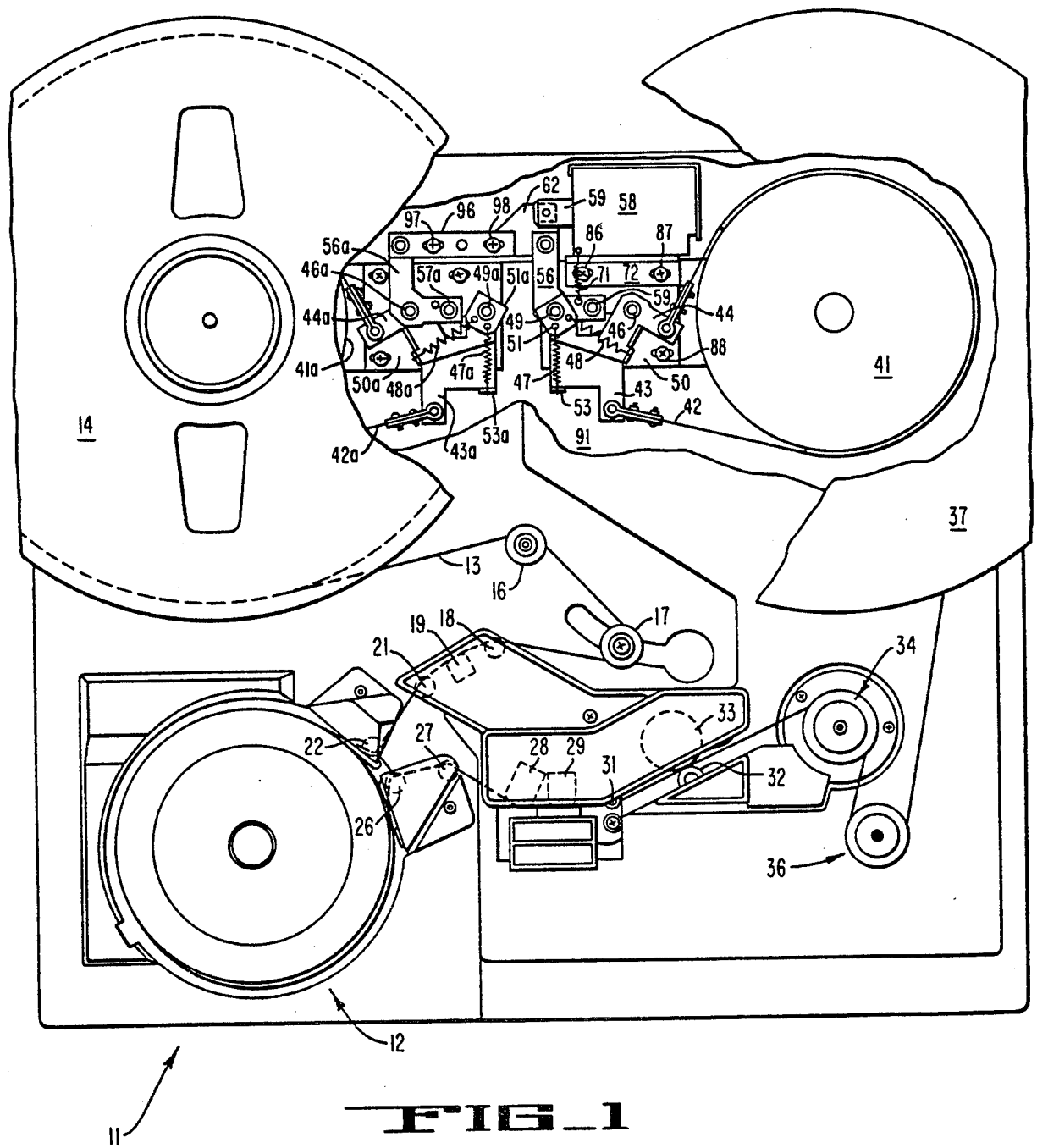
FIG_1

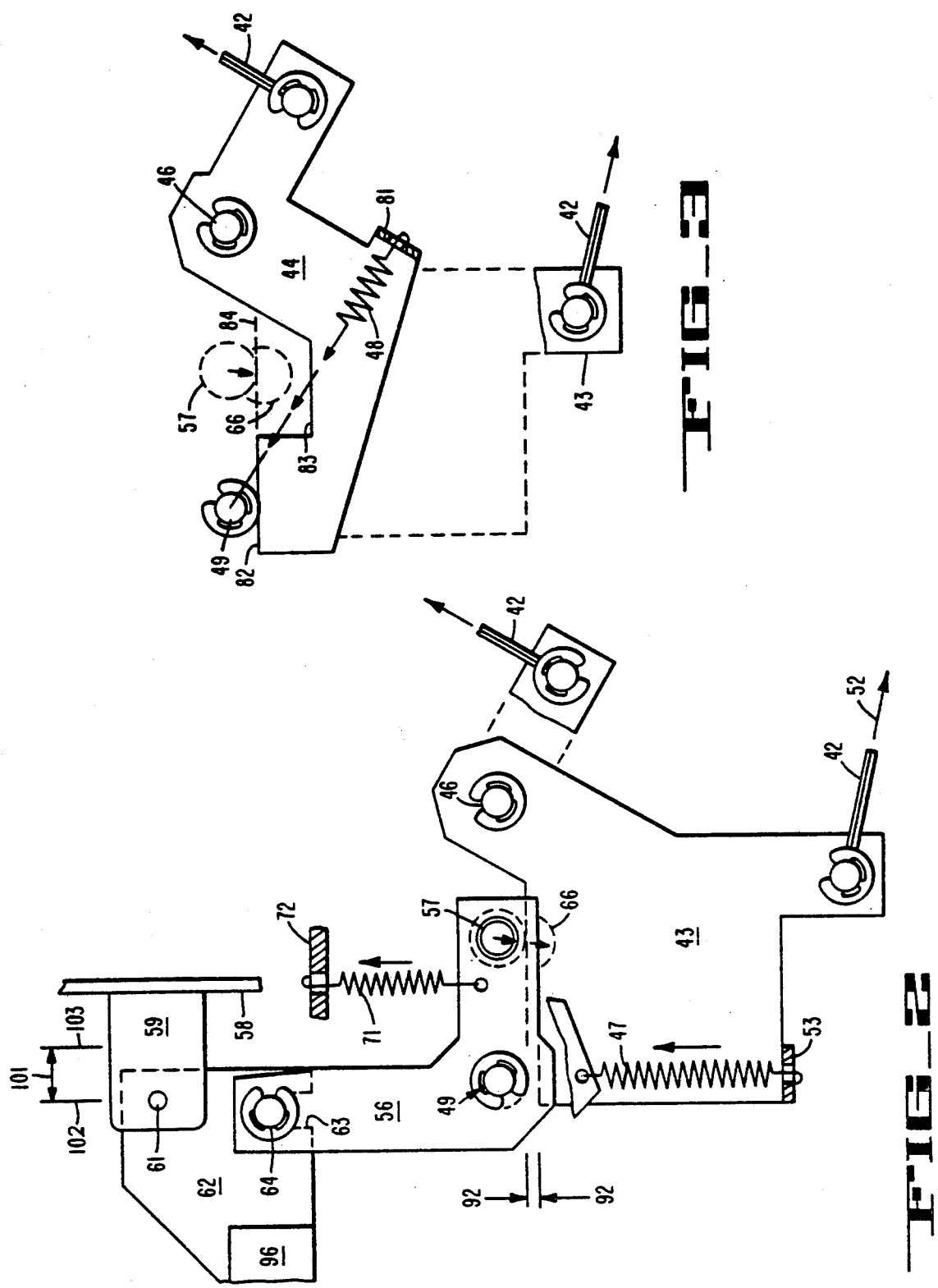

LOADING APPARATUS FOR DIFFERENTIAL BAND BRAKE

This invention relates to differential band brakes and particularly to loading apparatus for tensioning the bands of such brakes.

In the differential band brake art it is usual to employ a single pivoting arm having a single spring load, and both ends of the brake band are attached at different moment arm distances from, and on opposite sides of, the pivot point. Thus, using only a single spring, it is possible to obtain different braking forces in opposite directions of rotation of the drum. However, adaptability and design interchangeability are sacrificed in brakes of this type, for the differential ratio of braking forces cannot be altered by changing the springs, only by changing the arm or by re-working it to change the moment arm dimensions to the point of attachment of the brake band to the arm. Because springs are standardized for mass-production and interchangeability they are more readily available on the commercial market, and a manufacturer who makes a line of differing products, each requiring differential brakes with different ratios, or a single product type which must be adaptable for change to different ratios for different uses, will find advantage in changing the springs rather than the arms.

In the magnetic tape recording and reproducing art, it is the usual practice to provide differential band brakes for the two tape storage and transport reels; the brakes being relieved during operation of the machine while this tape is being transported from a supply reel to a takeup reel in e.g., forward motion, and also in the rewind direction, when the forward takeup reel becomes the rewind supply reel and the forward supply reel becomes the rewind takeup reel. At "end of tape" or when for any other reason the tape must be stopped or the power fails, the supply reel must always be brought to a stop with greater braking force than the takeup reel; otherwise the takeup reel may stop more rapidly and a loop of loose tape will be "thrown" from the supply reel, leading to tangling, damage, or at least inconvenience. It is not enough to brake only the supply reel, for the resulting severe tension increase could break the tape; the takeup reel must also be braked, but to a lesser degree.

Thus, it is clear that each reel brake must provide a greater braking force when it is acting as a supply reel, than when it is rotating in the opposite direction as a takeup reel.

Accordingly, it is an object of the present invention to provide a differential band brake loading apparatus adaptable for greater facility of adjustment in changing the braking force ratio in the two opposite directions of rotation.

SUMMARY OF THE INVENTION

A differential band brake is independently spring loaded at each end so that changes in the differential braking force ratio can be conveniently effected by changing to springs of different strength, such as are readily available on the commercial market, rather than by changing the parameters of other portions of the apparatus.

DESCRIPTION OF THE DRAWINGS

FIG. 1 is a plan view of a magnetic tape transport, broken away to show the apparatus of the present invention;

FIG. 2 is an enlarged fragmented plan view of a portion of the apparatus shown in FIG. 1; and FIG. 3 is a fragmented plan view of a portion of the apparatus shown in FIG. 1, to the same scale as that of FIG. 2.

DESCRIPTION OF THE PREFERRED EMBODIMENTS

Referring now to the drawings and particularly to FIG. 1 thereof, there is shown a magnetic tape transport 11 of a type adapted for recording and replaying television or other broad-band signals, and provided therefore with a helical scanning drum 12, to which the tape 13 is guided during forward play-record operation from a forward supply reel 14, as by means of a guide 16, a tape tension arm roller 17, guide 18, transducer head 19 and guides 21 and 22; and the tape 13 leaves the drum 12 and is guided thence by guides 26, 27, heads 28, 29, guide 31, capstan 32, pinch roller 33, tachometer 34, roller guide 36 and thence to the forward takeup reel 37.

The forward takeup reel 37 has a brake drum 41 around which is wrapped a brake band 42, secured at the ends to tensioning arms 43, 44 respectively.

Both tension arms 43, 44 are pivoted from the same pivot pin 46, and their respective loading springs 47, 48 are attached to the same anchoring pin 49 by means of a common shackle 51, and pins 46 and 49 are mounted to extend from a common mounting plate 50. Further description of the independent functionings of the two arms 43, 44 will best be given in reference to FIGS. 2 and 3, wherein the arms are illustrated separately and to an enlarged scale for the sake of greater clarity.

Referring now to FIGS. 1 and 2, it will be seen that when the reel 37 is acting as the forward takeup reel, it rotates in a counter-clockwise direction, and when the brake is first applied to stop the drum the inertia loaded frictional pull of the drum on the brake band 42 is also in a counter-clockwise direction, as illustrated in FIG. 2 by the arrow 52, tending to rotate the arm 43 counter-clockwise about its pivot pin 46, and against the opposite moment exerted on the arm 43 by the tension spring 47, attached to an ear 53 on the arm.

To relieve this spring-applied moment on arm 43, a bell-crank relief member 56 is pivoted at the apex thereof by pin 49, and a detent post 57 extends downwardly from one end of arm 56 to engage the upper edge of arm 43, so that when arm 56 is rotated clockwise, it rotates arm 43 counter-clockwise and slackens the band 42 upstream from the drum 41 in the direction of drum rotation.

The actuating means for arm 56 is a solenoid 58, which has a plunger 59 with a working stroke illustrated by arrow 101, between an "off" position 102 and "on" position 103 (FIG. 2). The plunger 59 is attached by a link pin 61 to a link member 62, which is mounted for sliding motion in a direction parallel to the line of the reel axes so as to be able to operate the brake for reel 14 simultaneously with that for reel 37, as will be described below in greater detail.

For pivoting the bell crank 56, however, the link member 62 is provided with a lost-motion slot 63 in which freely rides a detent 64 that extends downwardly from the upper arm of bell-crank 56.

Thus, when solenoid 58 is actuated during movement of the tape, plunger 59 and link 62 are moved to the right, bell-crank 56 is pivoted clockwise, and detent 57 is moved clockwise to an operating (brake-releasing) position illustrated by the dashed line 66, arm 43 is pivoted counter-clockwise against the force of spring 47, and the lower end of brake band 42 is moved in the direction of arrow 52, releasing the brake for the free rotation of reel 37.

At the end of the operating mode, or when for any other reason the brake must be applied, as e.g., upon power failure, the solenoid 58 is de-energized, and a spring 71, attached to bell-crank 56 and to a flange on a solenoid mounting bracket 72, operates to rotate the bell-crank 56 in a counter-clockwise direction, returning the link 62 and solenoid plunger 59 to the "off" position 102. The spring 47 concurrently re-loads the arm 43 and causes the arm to pivot in a clockwise direction, re-tensioning the brake band 42 around drum 41 and stopping the reel 37.

The re-application of the brake together with return of bell-crank 56, link 62 and plunger 59 could be effected entirely by spring 47, but such a requirement would cause the load to be applied by spring 47 to be greater than the load to be applied by the counterpart spring 47a (see below) for the reel 14 brake. It is preferable to ensure that springs 47 and 47a have equal loads, so that they can be selected to have identical characteristics from the array of commercially available springs. Thus, spring 71 is used to move all parts of the apparatus that do not function identically for both reels.

The functioning of arm 44 for tension-loading the band 42 in the rewind direction (clockwise) of reel 37 is as follows:

Spring 48, tensioned between pin 49 and an ear 81 formed on arm 44, pulls the arm 44 in a clockwise direction until a portion 82 of the arm engages and is stopped by the post 49. However, the brake band 42, when engaged, tends to pull the arm 44 in a counter-clockwise direction against the pull of spring 48. Therefore, the spring 48 cooperates to tension band 42 when the brake is engaged, but arm 44 is stopped by pin 49 from tensioning the band 42 when the band is slackened by counter-clockwise movement of arm 43 to release the brake.

To avoid having both arms 43 and 44 moved by the solenoid 58 when the brake is to be released, arm 44 is cut away at 83 to give free play to detent 57 in its movement to its extreme position 66. Thus the solenoid needs to move less mass, resulting in more rapid acceleration response for the same energy input, or, conversely a smaller solenoid or smaller energy input for the same speed of response.

However, in applications requiring the most rapid response, even at higher cost, the brake band can be released at both ends at the same time, as by continuing the edge 82 of the arm 44 to engage the detent 57 in the upper (inactive) detent position, as shown in phantom by line 84 in FIG. 3.

Now it will be seen that the left-hand brake (FIG. 1) for reel 14 is arranged in substantially mirror-image relationship to the brake for reel 37, except for bell-crank 56a and the connection of the bell-crank 56a to the solenoid 58, as by means of an adjustable link member 96 attaching the upper end of bell-crank 96 to the link 62. Particularly, the reel 14 brake has mirror-image parts corresponding respectively to the parts of reel 37 brake and designated as by having the same number followed by an "a", as follows: brake drum 41a, band 42a, arm 43a, arm 44a, pin 46a (which in this case mounts the bell-crank 56a), spring 47a, spring 48a, pin 49a, plate 50a, shackle 51a, ear 53a, detent 57a, and ear 81a.

The reel 14 brake link 96 connection to link 62 is a lost motion connection adjustable by means of clamping screws 97, 98 slidable in lost-motion slots in link 96.

Thus it will be clear that the brake for reel 14 operates exactly as does the brake for reel 37, except that, because of the mirror-image reversal of the parts named above, with respect to bell-crank 56a, the reel 14 is braked with less force (spring 48a) after forward motion of the tape than is reel 37 (spring 47); and the converse is true following rewind motion of the tape, i.e., reel 14 is braked with greater force (spring 47a) than is reel 37 (spring 48).

The two mounting plates 50 and 50a also have three mounting screws each, namely screws 86, 87, 88 and 86a, 87a and 88a, respectively, by which the plates are secured to the base 91 of the machine; and the plates 50, 50a have slots for left-right motion on the screws 88—88, 86a—88a when the screws are loosened, for making manufacturing adjustment described as follows for the reel 37 brake alone: first the screws 97, 98 are loosened to separate the adjustments for the respective brakes on reels 37, 14. Then the three mounting and guiding screws 86, 87 and 88 (FIG. 1) by which mounting plate 50 is secured to the base 91 of the machine, are loosened, and the plate 50 is moved to the left until a predetermined dimension 92 (FIG. 2) obtains between the upper edge of arm 43 and pin 49 (now acting as a stop for arm 43). The lower screw 88 is then tightened.

A similar adjustment is then made for the plate 50a, using screws 86a—88a.

Then the two elements 56, 56a are manually rotated until elements 57, 57a thereof just touch the adjacent upper edges of the elements 43, 43a, and the screws 97, 98 are tightened to lock the two brake structures together as a unit.

Lastly, power is applied to the solenoid, which is moved left or right on screws 86, 87 until the brake bands 42, 42a have a desired "brake-off" clearance from their respective drums 41, 41a, and the screws 86, 87 (and 86a, 87a) are tightened.

What is claimed is:

1. A differential loading apparatus for the band of a rotating brake drum, comprising:

a base member fixed against rotation with said drum;

a first arm mounted for pivoting motion on said base member, and having a pivoting portion attached to a first end of said brake band;

said first arm having a spring loaded coupling to said base member for tensioning the band around the drum and for opposing the forward rotation thereof in cooperation with:

a second arm mounted for pivoting motion on said base member and having a pivoting portion attached to the other end of said brake band;

said second arm having a springloaded coupling to said base member for tensioning the band around the drum and for opposing the reverse rotation thereof in cooperation with said first springloaded arm;

said first and second arms being adapted to apply different tensioning forces to said band, so that said band applies differential braking forces to said drum depending on the direction of drum rotation; and solenoid means and linkage means coupled between said solenoid means and one of said arms for relieving at least one end of said band upon energization of said solenoid to permit said drum to rotate, said linkage means being springloaded to free at least one arm upon de-energization of said solenoid means to ensure prompt braking of said drum.

2. Apparatus as recited in claim 1, wherein:

the moment arm dimensions between the pivot point and the respective band-attachment and springloaded-coupling points on each of said arms are substantially constant on the respective arm;

whereby the differential braking force ratio, as between braking forces in opposite directions of drum rotation, may be altered by replacing one or more of the springs defining said springloaded couplings, with springs of different strengths.

3. Apparatus as recited in claim 1, wherein:

two brake drum and band assemblies are provided in axially-parallel array in a magnetic tape transport, each of said assemblies being provided with a corresponding set of said first and second springloaded arms; and said solenoid and linkage means constitutes a common de-actuating means for relieving said brake band ends to permit the drums to rotate conjointly in forward and rewind modal tape transporting directions;

said springloaded couplings for said first arms being of greater force than said springloaded couplings for said second arms so as to brake the forward supply drum more strongly than the forward takeup drum when said common de-actuating means is itself de-actuated at the end of a forward operating mode of said tape transport, and to brake the rewind motion supply drum more strongly than the rewind motion takeup drum at the end of a rewind tape motion mode.

4. Apparatus as recited in claim 3, wherein said solenoid means is arranged for energization at the beginning of forward and rewind modal operation and for de-energization at the end of forward and rewind modal operation;

said two sets of first and second springloaded arms coupled to said bands being arrayed in mirror-image relation symmetrically about an axis that is centered between said drums and is normal to the common axial plane thereof so as to pivot in opposite angular directions for said relieving of said brake band ends;

said solenoid being mounted on said base member with the working stroke direction parallel to said common axial plane of said drums;

said links means comprising two bell-cranks coupled by a link member for conjoint pivoting motion in the same rotational directions and for conjointly engaging and disengaging said respective sets of arms and particularly said at least one arm of each set for said band relieving and tensioning operation of said brakes; and spring means are coupled to at least one bell-crank to aid the return of said brake band ends to tensioned condition at the end of modal operation of said transport.

* * * * *